(12) United States Patent
Krimmer et al.

(10) Patent No.: US 6,885,189 B1
(45) Date of Patent: Apr. 26, 2005

(54) MEASURING INSTRUMENT FOR CONTACTLESS DETECTION OF AN ANGLE OF ROTATION

(75) Inventors: Erwin Krimmer, Pluederhausen (DE); Asta Reichl, Stuttgart (DE); Thomas Klotzbuecher, Rudersberg (DE); Bernhard Bauer, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/959,106
(22) PCT Filed: Apr. 13, 2000
(86) PCT No.: PCT/DE00/01142
  § 371 (c)(1),
  (2), (4) Date: Feb. 8, 2002
(87) PCT Pub. No.: WO00/63648
  PCT Pub. Date: Oct. 26, 2000

(30) Foreign Application Priority Data

Apr. 17, 1999 (DE) .......................................... 199 17 467

(51) Int. Cl.⁷ ................................................. G01B 7/30
(52) U.S. Cl. .................................................. 324/207.25
(58) Field of Search .................... 324/207.11, 207.13, 324/207.15, 207.2, 207.21, 207.25, 251.252, 260; 123/612, 617

(56) References Cited

FOREIGN PATENT DOCUMENTS

| DE | 197 00 046 A1 | 7/1997 |
|----|---------------|--------|
| DE | 197 31 555 A1 | 4/1998 |
| DE | 298 17 399 U  | 4/1999 |
| DE | 197 53 775 A1 | 6/1999 |
| EP | 0 611 951 A   | 8/1994 |
| WO | 99 05475 A    | 2/1999 |

*Primary Examiner*—Bot LeDynh
(74) *Attorney, Agent, or Firm*—Michael J. Striker

(57) ABSTRACT

A measuring instrument for contactless detection of an angle of rotation comprises a carrier plate (52) consisting of a magnetically soft material that serves as a rotor. The stator of the sensor comprises at least two parts, the ends (18 and 17) of which terminate in two planes. The measuring gap (M1) containing an element (20) that is sensitive to a magnetic field is located between the ends (18, 17). Due to the fact that the ends (17, 18) of the two stator parts (13, 14) terminate in different planes, the measuring element (20) can be situated in a very small measuring gap (M1) in which the magnetic flux of the magnet (5) can be concentrated.

6 Claims, 3 Drawing Sheets

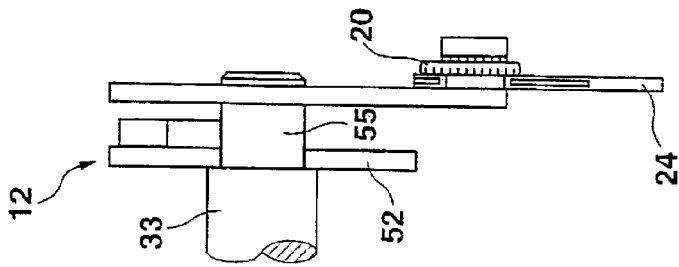
Fig. 4
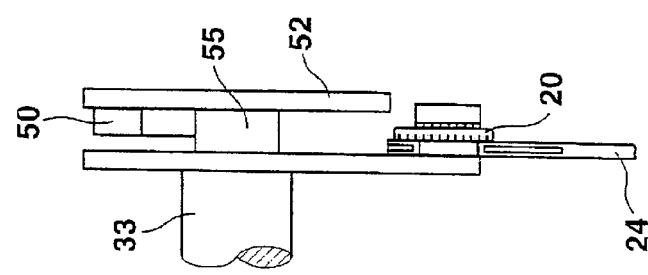
Fig. 3
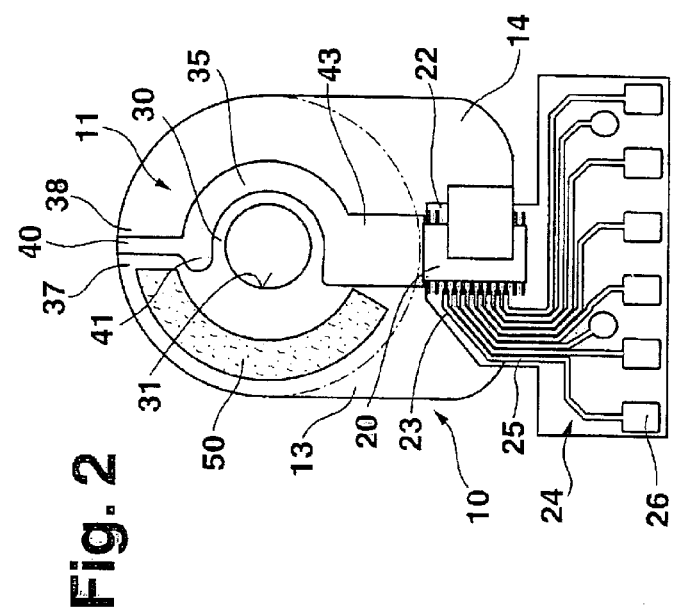
Fig. 1
Fig. 2

MEASURING INSTRUMENT FOR CONTACTLESS DETECTION OF AN ANGLE OF ROTATION

BACKGROUND OF THE INVENTION

The invention is based on a measuring instrument for contactless detection of an angle of rotation. A sensor is made known in DE-OS 197 53 775.8, which was published subsequently, in which the rotor and the stator are stacked in two planes. The stator comprises two parts, between which a measuring gap and a spacer gap are located. A magnet is situated on the rotor, which is connected to a shaft, the rotary motion of which is to be determined. In this design, however, the rotor, the measuring element, and the stator must be lined up correctly and exactly.

SUMMARY OF THE INVENTION

In contrast, the measuring instrument according to the invention for contactless detection of an angle of rotation has the advantage that the measuring element does not restrict the operative range of the measuring instrument. When the output signal is linear, a measurable angle of rotation of up to 140° can be achieved. The measuring instrument can hereby be installed in a "left-hand and right-hand application", e.g., in a gas pedal. This means that the sensor can be installed in simple fashion in a left-hand drive or right-hand drive vehicle. The rotor with the magnets can be installed either above or below the stator and thereby rotate 360° as well. Due to the special design of the stator, a magnetic flux concentration can be achieved in simple fashion that results in an improvement of the measuring signal in the element that is sensitive to a magnetic field. It is also possible to kept the actual measuring gap very narrow when a rigid printed circuit board and a flat construction are used. The advantage of this is that a maximum magnetic flux can be achieved through the small measuring gap using small magnets. The measuring gap itself is determined only by the thickness of the actual measuring element. If the ends of the two stator parts extend above one another, a constant magnetic flux is achieved even with large production tolerances.

Due to its simple construction, the sensor can be integrated in various systems, such as a throttle measuring device or a pedal module for a brake and gas-pedal valuator with relatively little installation effort, or it can be used as an independent sensor in throttle blade sensors or a body compression device.

BRIEF DESCRIPTION OF THE DRAWINGS

Embodiments of the invention are presented in the diagram and explained in greater detail in the description below.

FIG. 1 shows a longitudinal view through the stator and the printed circuit board in the area of the measuring gap without rotor.

FIG. 2 shows a top view of the measuring instrument, whereby the only part of the rotor depicted is the magnet situated on top of it.

FIGS. 3 and 4 show a longitudinal view in the direction A—A according to FIG. 2, whereby FIG. 3 represents the view according to FIG. 2 with the rotor, which is situated above the stator. FIG. 4 shows an alternative to this with a rotor situated below the stator.

FIG. 6 shows a top view of the stator, FIG. 5 shows a view in the viewing direction V, FIG. 7 shows a view in the viewing direction VII according to FIG. 6, and FIG. 8 shows a perspective illustration of the stator.

DESCRIPTION OF THE PREFERRED EMBODIMENTS

Figure 5:
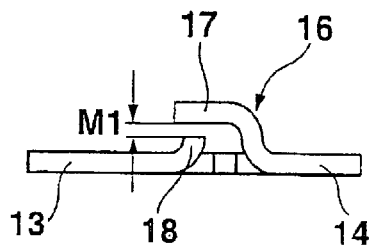
FIGS. 5 through 8 show different depictions of the stator, whereby

In FIGS. 1 through 3 and 4, a sensor is shown as 10 that comprises a stator 11 and a rotor 12. As one can see in FIG. 2, the stator 11 comprises two parts 13, 14, which are separated from each other by gaps of different widths. The essential feature of the invention is obvious in FIG. 1, i.e., the fact that the ends of the two stator parts 13 and 14 terminate in two stacked planes and thereby overlap each other. To achieve this, one end 16 is bent out of the plane of the stator part 14, so that its end 16 has an extension 17 that extends in a plane that is parallel to the first plane. The extension 17 is thereby so long that it overlaps the end 18 of the other stator part 13. To achieve this, the end 18 of the stator part 13 is bent out of the plane of the stator part 13, so that the face of the end 18 points toward the extension 17. It would also be feasible, however, that the end 18 of the stator part 13 is not bent upward, but rather terminates in the plane of the stator part 13 or in the plane of the stator part 14. The measuring gap M1 is located between the end 18 and the extension 17 of the stator part 14. In FIG. 1, the extension 17 extends over the face of the extension 18, producing an overlap U1. Because of this overlap U1, tolerance problems encountered during installation of the stator in the sensor 10 can be offset. It would also be feasible, however, that the extension 17 terminate flush with the side of the end 18 facing away from the stator part 14, as shown in FIG. 5, for example. An element 20 that is sensitive to a magnetic field is situated in the gap M1; it detects the change in magnetic flux, as will be explained below. Magnetoresistors, a magnetic transistor, coils, magnetoresistive elements or a Hall element, for example, can be used as the element 20 that is sensitive to a magnetic field. It is important hereby that the output signal of the component that is sensitive to a magnetic field have the greatest possible linear dependence on the magnetic induction B. A measurement using a single element that is sensitive to a magnetic field, a Hall element, is shown in each case in the figures. In this case, the element 20 must be situated in the gap M1. It would also be feasible, if necessary, to place one or more measuring elements in the measuring gap M1, so that a "redundant measurement" could be carried out. The electrical connections of the Hall element 20 are situated on the extensions 22, 23 of a printed circuit board 24. The circuit-board conductors 25 of the printed circuit board 24 and the respective electrical connections 26 are shown in FIG. 2.

As shown in FIG. 2, the stator part 13 has an extension 30 with a hole 31 with which the stator part 13 encompasses a shaft 33 with play. A first spacer gap 35 is located between the two stator parts 13, 14 in the area of this extension 30 that covers an angular range of 180°. The spacer gap 35 must be so large that preferably no magnetic flux at all is possible in its area between the two stator parts 13, 14. Moreover, a second spacer gap 40 occurs between the other ends 37, 38 of the two stator parts 13, 14, i.e., the ends opposite from the ends 18, 16 of the stator parts 13, 14. The junction between the spacer gap 35 and the spacer gap 40 has an extension 41 designed in the shape of a segment that projects into the stator part 13. Then a third spacer gap 43 connects with the other end of the spacer gap 35 that transitions into a fourth spacer gap 44. The fourth spacer gap 44 is located below the extension 17 of the stator part 14 and indicates the distance between the ends 16, 18 of the stator part 13 lying in one plane, and the stator part 14. All spacer gaps can be filled either with air or another magnetically nonconductive material. It is also possible to fill the spacer gaps with different material, of course. Assuming that the spacer gaps are filled with air, the spacer gap 44 must be larger than the measuring gap M1. This is necessary so that only a minimal magnetic flux—or no magnetic flux at all—is able to flow across the spacer gap 44, but rather it flows across the measuring gap M1 as concentrated as possible. The spacer gap 43 must be larger than the spacer gap 35 with regard for the magnetic flux as well. In any case, however, the spacer gap 43 must be as close to the same size as the spacer gap 44 as possible. The rotor 12 is shown only partially in FIG. 2 to improve clarity. Only the magnet 50—which generates the magnetic flux mentioned repeatedly above, above—is shown here. The magnet 50 is shown in FIG. 2 as a U-shaped section that extends from the spacer gap 40 to the spacer gap 43. In FIG. 2 it is shown as a continuous part designed in the shape of a ring. If the measuring curve that is measured has plateaus or other non-linear transitions, the magnet 50 can comprise numerous sections that are separated by more or less large sections. The magnet can be designed as a permanent magnet that is polarized in the axial direction, i.e., perpendicular to the stator 11 or its carrier plate 52. The magnet 50 can be designed as a sector of a circle (segment of a circle) or as part of a ring. Its angular range is at least as great as the maximum angle of rotation to be determined of the component to be monitored and/or measured. As one can see in FIG. 2, the angular range of the permanent magnet 50 in this embodiment is nearly 180°, so that an angle of rotation of 180° to be measured can be achieved. FIGS. 3 and 4 now show that the permanent magnet 50 with its carrier plate 52 can be situated above (as indicated in FIG. 2 as well). i.e., as shown in FIG. 3, or below the stator 11, as shown in FIG. 4. In the arrangement shown in FIG. 3 (rotor 12 in a plane above the stator 11), the shaft 33 extends through the opening 31 in the extension 30 of the stator part 13, so that a carrier plate 52 can be attached to the end of the shaft 33. The distance between the stator 11 and the carrier plate 52 must be so great that the magnet 50 situated on the side of the carrier plate 52 facing the stator can move freely with the rotary motion, i.e., there must be an air gap L1 located between the top side of the magnet 50 facing the stator 11 and the stator 11 that must remain as constant as possible as the rotor 12 rotates, however. The diameter of the rotor 12, i.e., the diameter of the carrier plate 52, must be separated from the end 17 and 18 by an air gap>M1.

In FIG. 4, the rotor 12 is now situated below the stator 11. The design of the rotor 12 corresponds to that shown in FIG. 3. The arrangement is a mirror image, of course, because the magnet 50 must be situated on the carrier plate 52 so that it faces the stator 11. As one can see in FIG. 4, an extension 55 of the shaft 33 now extends through the carrier plate 52 of the rotor 12 and is supported in rotating fashion at the stator 11 in the opening 31 of the extension 30 of the stator part 13.

The carrier plate 52 and the two stator parts 13, 14 are produced using magnetically conductive materials. In order to achieve a closed magnetic circuit, the shaft 33—or at least its extension 55—must also consist of magnetically conductive material.

Figure 6:
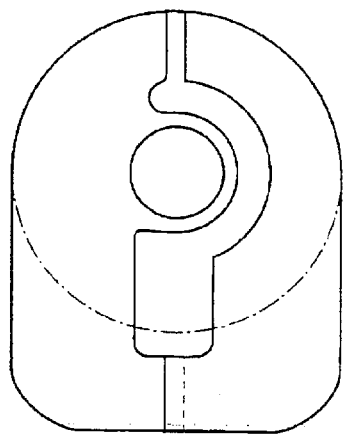
Figure 7:
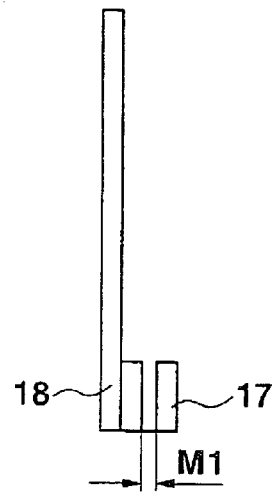
Figure 8:
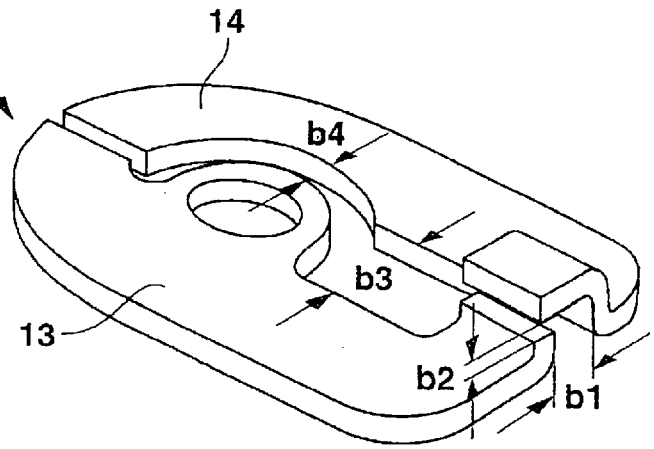

A perspective diagram of the stator 11 with the two stator parts 13, 14 is shown in FIG. 8. FIGS. 5 through 7 present top views of the stator 11 according to FIG. 8. In FIG. 8, one can see the different sizes of the four spacer gaps and the measuring gap M1 based on the assumption that they are air gaps. FIG. 5 shows the variant mentioned above, in which the extension 17 of the end 16 of the stator part 14 terminates with the edge of the end 18 of the stator 13 facing away from the end 16. The overlapping ends 17 and 18 of the gap M1 located between them is also obvious in the partial section shown in FIG. 7.

Figure 9:
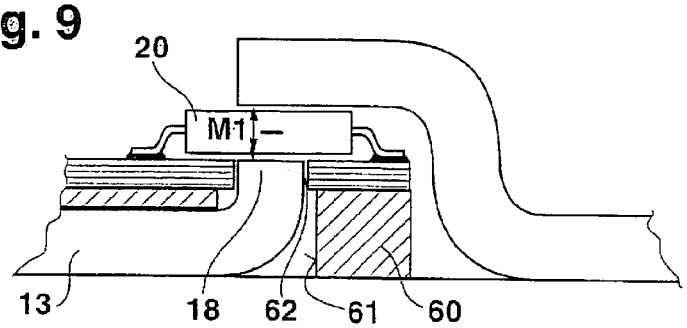
FIG. 9 shows an enlarged view of a modification of the area around the measuring gap with Hall IC and printed circuit board.

A particular embodiment is now shown in FIG. 9 that makes it possible to concentrate the magnetic flux of the magnet 50 in the area of the measuring gap M1. This is achieved in that the sensitive area of the element 20 that is sensitive to a magnetic field is situated in the area of the concentrated, i.e., the strongest, magnetic flux to the extent possible. To achieve this, the carrier 60 of the printed circuit board 24 has a recess 61 that is larger than or flush with a recess 62 in the printed circuit board 24. The end 18 of the stator part 13 extends through these two recesses 61, 62 and terminates somewhat flush with the surface of the printed circuit board 24. Over the face of the end 18 of the stator part 13, i.e., in the measuring gap M1, the most sensitive area of the element 20 that is sensitive to a magentic field is now situated as centered as possible over the face of the extension 18. Due to these recesses 61 in the carrier 60 and the recess 62 in the printed circuit board 24, it is also possible that, in this design based on FIG. 9, the measuring gap M1 is determined almost only by the thickness of the element 20 that is sensitive to a magnetic field. This very small measuring gap M1 has the advantage that a maximum magnetic flux and, therefore, a clear measuring signal, is produced even with magnets having low magnetic force produced as a result of a small size, for example. It should also be pointed out that, in FIG. 9 as well, the end 16 of the stator part 14 bends into a second plane along the carrier 60 and the printed circuit board 24, so that the extension 17 of the stator part 14 is located in a plane that is parallel to the remaining area of the stator part 13 and 14.

Figure 10:
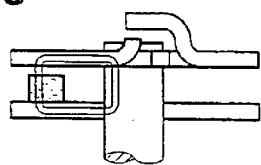
FIGS. 10 and 11 show the magnetic flux at an angle of 0° and an induction B=0.
Figure 12:
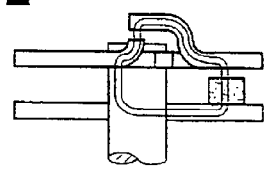
FIGS. 12 and 13 show the corresponding magnetic flux at a maximum angle and an induction B=max.
Figure 11:
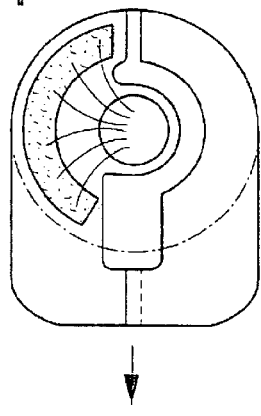
Figure 13:
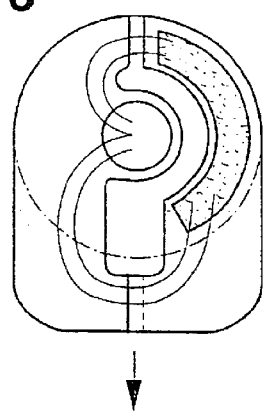
Figure 14:
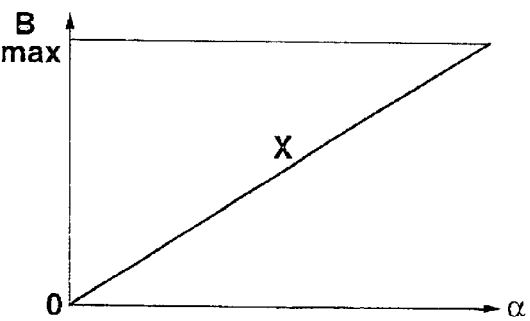
FIG. 14 shows the corresponding course of induction B over the angle of rotation a. In contrast to FIGS. 10 and 12, the FIGS. 11 and 13 only show the magnet without its carrier, i.e., the rotor, for reasons of simplification.

FIG. 14 shows the course of the characteristic line of the magnetic induction B in element 20, e.g., a Hall element, across the angle of rotation a of the axle 33. It is obvious that, at an angle of rotation α of 0°, the induction B is also 0, and it reaches the maximum induction value at the maximum angle of rotation a. In this embodiment, the maximum measuring angle range is reached at approximately 180°. The placement of the sensor 10 at an angle of rotation of 0° is shown in FIGS. 10 and 11, whereby the magnet 50 is drawn without the carrier plate 52 in FIG. 11 as well, to improve clarity. From FIG. 10 one can see that the magnetic flux of the magnet 50 flows through the carrier plate 52 and the extension 55 of the shaft 33 over a minimal bearing gap to the stator part 13 and, from there, returns to the permanent magnet over a minimal gap that serves to permit the rotor to move across from the stator. As one can see in FIG. 11 in particular, the magnetic flux is controlled by way of the gaps 35, 41, 40, 43 in such a way that, at an angle of rotation of 0°, it does not flow through the element 20, so that no magnetic induction B can take place in the element 20. If the axle 33 and, therefore, the carrier plate 52, are now turned with the magnets 50, the magnetic flux flowing through the element 20 is increased, and the linear measuring line shown in FIG. 14 is produced. The setting of the sensor at a maximum angle of rotation at is shown in FIGS. 12 and 13. A carrier plate 52 is not drawn in FIG. 13, either, to improve clarity. As one can see in FIG. 12, the magnetic flux—at a maximum angle of rotation α—flows through the carrier plate 52, the extension 55 of the shaft 33, over the bearing gap of the shaft 33 of the stator part 13, and into the stator part 13. From there, the magnetic flux is distributed by way of the gaps 41, 35, 43, and it flows back to the magnet 50 partially by way of the gap 40. Approximately half of the magnetic flux flows in the stator part 13 into the end 18, and from there through the element 20 to the extension 17 of the end 16 of the stator part 13. From the stator part 14, the magnetic flux flows back to the magnet 50 over the minimal gap mentioned above. The entire magnetic flux is therefore directed through the element 20, so that a maximum possible magnetic induction B is effected in the element 20.

The sensor described above can now be installed in a throttle positioning unit in simple fashion. In this unit, the angle of rotation of a throttle blade is detected for purposes of engine control. The two stator parts 13, 14 can then be situated directly in the cover of the throttle positioning unit.

Furthermore, an independent sensor for detecting the brake and/or gas pedal or other applications can be presented.

What is claimed is:

1. A measuring instrument for contactless detection of an angle of rotation, comprising a stator and a rotor between which the angle of rotation is to be detected; a magnet situated on said rotor; a shaft with which said rotor is an active contact; an extension, said shaft, said extension, and said rotor being composed of a magnetically soft material, said magnet being polarized in a direction of an axle of said shaft, said stator and said rotor being located so that a gap is provided therebetween, said stator being composed of at least two parts which are separated by at least one magnetically non conductive gap; at least one element which is sensitive to a magnetic field and located in at least one of said magnetically non-conductive gaps formed as a measuring gap, said rotor and said stator being formed as discs, said two stator parts having ends which are situated in two stacked planes located in an axial direction of said shaft, said at least one element which is sensitive to a magnetic field being situated between said ends of said stator in said measuring gap so that a magnetic flux flows in an axial direction of said shaft.

2. A measuring instrument as defined in claim 1, wherein said magnetically non conductive gaps between said parts of said stator include a first gap which is larger than a second gap.

3. A measuring instrument as defined in claim 2, wherein said magnetically non conductive gaps between said parts of said stator include a fourth gap which is designed to be larger than said measuring gap.

4. A measuring instrument as defined in claim 1, wherein one of said parts of said stator has a further extension into which said shaft extends.

5. A measuring instrument as defined in claim 1, wherein one of said parts of said stator has a further extension into which said first mentioned extension extends.

6. A measuring instrument as defined in claim 1, wherein one of said stator parts has an end which overlaps an end of the other of said stator parts by a distance.

* * * * *